US005774126A

United States Patent [19]
Chatterjee et al.

[11] Patent Number: 5,774,126

[45] Date of Patent: Jun. 30, 1998

[54] METHOD AND APPARATUS FOR DYNAMICALLY CHANGING THE COLOR DEPTH OF OBJECTS DISPLAYED IN A COMPUTER SYSTEM

[75] Inventors: Amit Chatterjee, Redmond; Stuart T. Laney, Seattle; Stuart Raymond Patrick, Issaquah, all of Wash.

[73] Assignee: Microsoft Corporation, Redmond, Wash.

[21] Appl. No.: 562,801

[22] Filed: Nov. 27, 1995

[51] Int. Cl.[6] .......... G06T 11/00

[52] U.S. Cl. .......... 345/431

[58] Field of Search .......... 395/128, 131, 395/340; 345/132, 153, 155, 428, 431, 340

[56] References Cited

U.S. PATENT DOCUMENTS

| | | | |
|---|---|---|---|
| 4,897,799 | 1/1990 | Le Gall et al. | 395/131 |
| 5,388,201 | 2/1995 | Hourvitz et al. | 395/340 |
| 5,420,605 | 5/1995 | Vouri et al. | 345/132 |
| 5,469,190 | 11/1995 | Masterson | 395/131 |
| 5,528,261 | 6/1996 | Holt et al. | 345/153 |
| 5,566,283 | 10/1996 | Modegi et al. | 395/131 |

*Primary Examiner*—Mark K. Zimmerman
*Attorney, Agent, or Firm*—Klarquist Sparkman Campbell Leigh & Whinston, LLP

[57] ABSTRACT

In response to a change in the color depth of a computer system's display device, the invention dynamically changes the color depth of existing objects in system memory to match the changed color depth of the device. As a result open applications need not be shut down and then reopened to change the color depth of objects already in system memory. The dynamic changing is accomplished through a number of functions calls between an application, the operating system and a display driver. In one embodiment of the invention, copies with the changed color depth are made at one time of all objects in system memory and the original objects discarded. The copies are then transferred to screen memory (if the display device is a video display terminal) for display as they are requested. In another embodiment of the invention, copies with the changed color depth are made selectively as the objects are transferred to the screen memory. The copies are then discarded from system memory after transfer and the original objects retained.

16 Claims, 8 Drawing Sheets

METHOD AND APPARATUS FOR DYNAMICALLY CHANGING THE COLOR DEPTH OF OBJECTS DISPLAYED IN A COMPUTER SYSTEM

FIELD OF THE INVENTION

This invention relates generally to computer graphics. More particularly, this invention relates to dynamically changing the color depth of objects stored in the memory of a computer system for display.

BACKGROUND OF THE INVENTION

In the field of computer graphics, computer programs such as applications and system programs create and display objects on display devices. The objects such as bitmaps, pens and brushes are composed of pixels and have a color depth measured in bits per pixel. They are displayed on devices such as video display terminals and printers that also have a color depth. A display device may be set to one of a number of color depths through a display driver, which is a software routine that controls the operation of the device in response to commands from the computer's operating system or an application. For example, a video display terminal may have color depths such as of 1, 4, 12, 24 or 32 bits per pixel (bpp) which is set by its display driver, the greater number of bits providing a wider range of colors.

In typical operation, the color depths of display devices connected to a computer system are stored in a file maintained by the operating system, and each display device reads its color depth upon system startup. Thus printer A may read a color depth of 32 bpp, printer B may read a color depth of 24 bpp, and the video display terminal may read a color depth of 8 bpp. The display drivers create objects in system memory with the color depth of the device. For example, bitmaps may be created by the display driver for the video display terminal and then stored in system memory for later transfer (e.g., copy) to screen memory for display.

A drawback of present computer systems is the difficulty in rapidly changing the color depth of existing objects in system memory if the color depth of the device for displaying the object is changed after an object's creation. For example, if a user uses an application to create device dependent bitmaps (DDBs) at 16 bpp and then changes the color depth of the display device to 24 bpp, the 16 bpp bitmaps cannot be properly displayed on the device. The user must first convert these bitmaps to the proper color depth by saving the bitmaps to disk as device independent bitmaps (DIBs), close the application that created them, and then reboot the computer system and reopen the applications to change to the new color depth. The bitmaps are then recreated in system memory as DDBs with the new color depth. Of course, objects created after the color depth is changed are not affected since they are created with the proper color depth.

An alternative to the use of DDBs is to store all objects as DIBs in system memory, which objects are automatically converted to the color depth of the display device as they are transferred from system memory to screen memory. However, this conversion, which occurs on each and every transfer, is time consuming and repetitive and slows the transfer process to the point that operation of the computer system is affected. For that reason, applications normally store objects in system memory as DDBs rather than DIBs to minimize the transfer time.

Presently there is no practical alternative to the slow and tedious process of closing applications and rebooting the computer system. The problem is bad enough with a single application, but is aggravated when multiple programs are executing in a multitasking environment. For example, a user may run a word processor at one color depth and then open a drawing application at another color depth with which he or she desires to create drawings. If the user wishes to increase the color depth for the drawing, he must close both applications, change the color depth, reboot the system, and then reopen the applications. Unless this process is followed, the bitmaps created before the color depth change cannot be accurately displayed.

An objective of the invention, therefore, is to provide for dynamically changing the color depth of existing objects in system memory to match the color depth of the display device, thereby avoiding the need to close applications, reboot the computer system and reopen the application.

SUMMARY OF THE INVENTION

A method according to the invention for dynamically changing the color depth of an object stored in memory includes the following steps. In response to a change in the color depth of a display device such as a video display terminal, the changed color depth is determined. Objects in the system memory whose color depth differs from the changed color depth are then found. The objects are then converted while in memory to the changed color depth. Unlike prior approaches, the objects need not be saved to disk and the applications shut down during a reboot of the computer system. The invention thus provides a much faster and simpler method for changing color depth.

In one embodiment of the invention, individual objects are found as they are selected for transfer to the display device, such as to the screen memory of the video display terminal. The objects may be checked to determine which must be converted to the changed color depth. Converting these identified objects includes making in system memory a copy of the object from an original (the copy having the changed color depth), transferring the copy to the display device as it is drawn, and retaining the original object and discarding the copy from system memory.

In another embodiment of the invention, all of the objects in system memory are found once the color depth has been changed. Converting the objects to the changed color depth then includes making in system memory copies of all of the objects from originals once the objects are found, transferring the copies to the display device as they are drawn, and retaining the copies and discarding the original objects from system memory.

The change in color depth of the display device may be initiated in any number of ways, such as manually by the user working through a utility program or automatically by an application that has a preferred color depth for objects it creates.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

Figure 1:
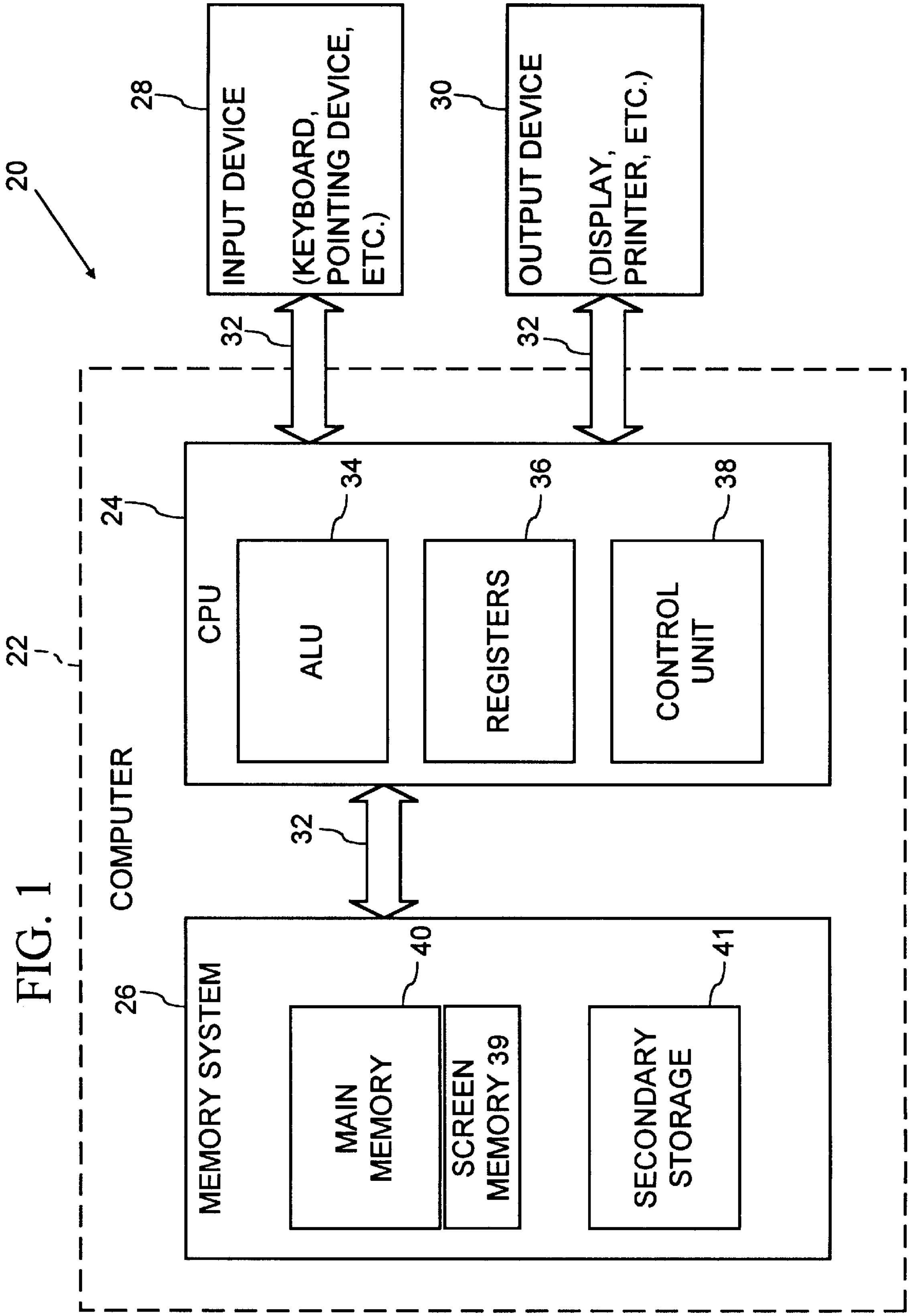
FIG. 1 is a block diagram of a computer system that may be used to implement a method and apparatus embodying the invention.

FIG. 1 is a block diagram of a computer system 20 which is used to implement a method and apparatus embodying the invention. Computer system 20 includes as its basic elements a computer 22, input device 28 and output device 30.

Computer 22 generally includes a central processing unit (CPU) 28 for executing instructions such as functions and a memory system 26 that communicate through a bus structure 32. CPU 24 includes an arithmetic logic unit (ALU) 33 for performing computations, registers 36 for temporary storage of data and instructions and a control unit 38 for controlling the operation of the computer system.

Memory system 26 generally includes high-speed main memory 40 in the form of a medium such as random access memory (RAM) and read only memory (ROM) semiconductor devices and secondary storage 41 in the form of a medium such as floppy disks, hard disks, tape, CD-ROM, etc. and other devices that use optical or magnetic recording material. Main or system memory 38 stores programs such as a computer's operating system and currently running application programs. Screen memory 39 is also high speed RAM for displaying images through a display device. Screen memory 39 may be separate from or within a portion of main memory 40.

Input device 28 and output device 30 are typically peripheral devices connected by bus structure 32 to computer 22. Input device 28 may be a keyboard, modem, pointing device, pen, or other device for providing input data to the computer. Output device 30 may be a video display terminal, printer, sound device or other device for providing output data from the computer 22.

It should be understood that FIG. 1 is a block diagram illustrating the basic elements of a computer system; the FIG. is not intended to illustrate a specific architecture for a computer system 20. For example, no particular bus structure is shown because various bus structures may be used to interconnect the elements of the computer system in a number of ways, as desired. CPU 24 may be comprised of a discrete ALU 34, registers 36 and control unit 38 or may be a single device in which these parts of the CPU are integrated together, such as in a microprocessor. Moreover, the number and arrangement of the elements of the computer system may be varied from what is shown and described in ways known in the art (i.e. multiple CPUs, client-server systems, various computer networks, etc.)

Figure 2:
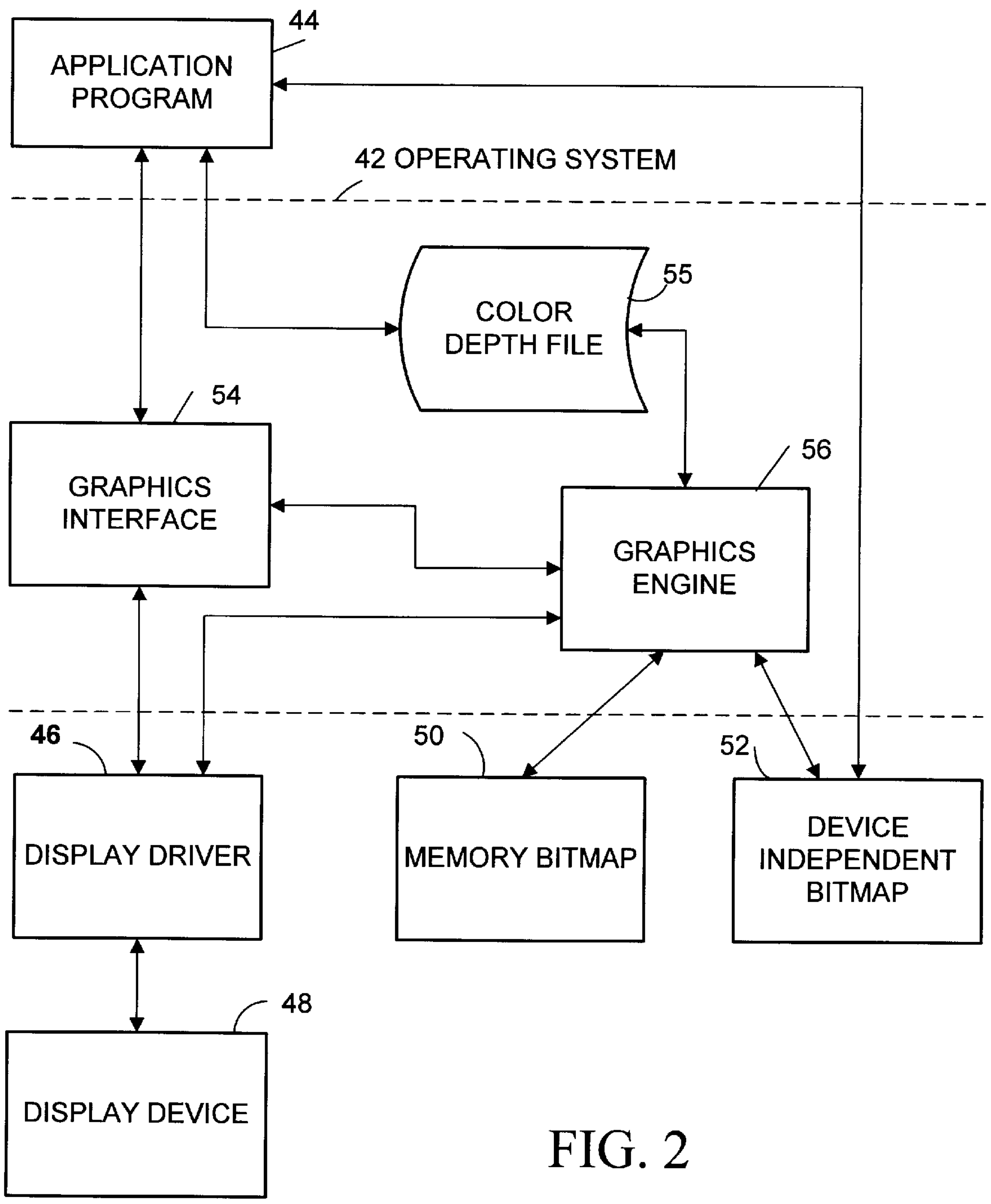
FIG. 2 is a block diagram of an application program, operating system, display driver and display device within a computer system such as shown in FIG. 1.

FIG. 2 is a block diagram of the software that executes on a computer system 20 in accordance with the invention. A portion of an operating system 42 communicates with an application program 44 and a display driver 46. The term "application" is intended hereafter to include graphical and textual user interfaces to the operating system, such as command line interfaces, screen editors, utility programs, etc. These software elements may reside in memory system 26, preferably in main memory 40 but they may also reside in secondary storage 41 and be swapped in and out of the main memory as needed. Operating system 42 further communicates with a display device 48, memory bitmaps 50 and device-independent bitmaps 52. Display device 48 includes any display devices such as a graphics or display adapter that includes screen memory 39 or a printer that includes a memory buffer (not shown). Within the illustrated portion of operating system 42 are a graphics interface 54, a color depth file 55 and a graphics engine 56. Color depth file 55 contains color depth values for display drivers that are associated with display devices connected to computer system 20. The values indicate the bits per pixel, or color depth, of the associated display device. Each of the blocks in FIG. 2 except for display device 48 and bitmaps 50, 52 is typically implemented as a data file or a module of code containing a set of related instructions or functions, although not limited to the blocks shown.

This, of course, is only a description of one form the software may take.

Graphics engine 56 or its equivalent may also be contained in the graphics interface or other parts of operating system 42.

For drawing onto screen memory 39, graphics interface 54 communicates with a display device 48 through a display driver 46. A display driver is a software routine or code module containing a set of functions designed for accommodating the hardware characteristics of a particular display device, such as a true color display adapter, a display accelerator, etc. A display driver also contains device-specific code needed to carry out particular graphics operations on the device. Function calls from an application 44 to functions in graphics interface 54 are translated by the graphics interface into corresponding calls to functions in a display driver 46 for the particular device 48. These display driver functions then execute instructions for drawing graphics or performing other graphics operations on the display screen. Depending on the capabilities of the display device, graphics interface 54 may generate many calls to a display driver 46 in response to a single call from an application 44.

In a preferred embodiment of the invention, graphics interface 54 may also communicate with a display device 48 through graphics engine 56. This communication occurs both directly through the graphics engine and indirectly through a display driver 46, depending on the purpose for which the graphics engine is invoked. The communication is direct if graphics interface 54 is called by an application 44 to create or draw onto a memory surface defining a device-independent bitmap (DIB) 52. In this case, graphics interface 54 calls a function in graphics engine 56. The graphics engine in turn creates or draws directly onto a DIB 52 in main memory 40. As part of its execution of the function for creating a DIB, graphics engine 56 returns an identifier identifying the DIB to graphics interface 54 such as a pointer to the memory location for the DIB's pixel bits. The graphics interface in turn passes this identifier to application 44 to enable the program to draw directly onto the DIB without the involvement and inherent drawing limitations of operating system 42. This direct communication between DIB 52 and application 44 is indicated in FIG. 2 by a long arrow on the right side of the FIG.

The communication between graphics interface 54 and graphics engine 56 is indirect if the graphics interface is called by an application 44 to draw onto screen memory 39. This communication is described generally above wherein graphics interface 54 calls a function in display driver 46 to draw onto the display screen of memory display device 48. Display driver 46 examines the function call to determine if the requested function may be performed by the graphics engine. If executing can be done more efficiently by the display device (such as high speed pattern drawing), then display driver 46 carries out the function's operation. However, if executing the function is too complex for the display device, then display driver 46 calls an appropriate function in the graphics engine, which carries out the requested graphics operation. In this way, each of the display drivers 46 does not have to include code for common drawing operations such as creating rectangles, lines, etc., but can be limited to code necessary to utilize unique features of their respective unique display devices. By placing the code for carrying out common graphics operations in graphics engine 56 rather than in all of the display drivers, a substantial duplication of code is avoided and the display drivers may be much simpler in design.

This indirect communication through display driver 46 also occurs when the function call from graphics interface 54 to the display driver involves performing graphics operations on a memory surface defining a memory bitmap 50 that is not created specifically as a DIB, but generally has the format of a DIB. These bitmaps are created and stored in main memory 40 for various purposes, such as for transferring a bitmapped image to a display screen. Graphics engine 56 may be used for creating and drawing onto these memory bitmaps.

Figure 3:
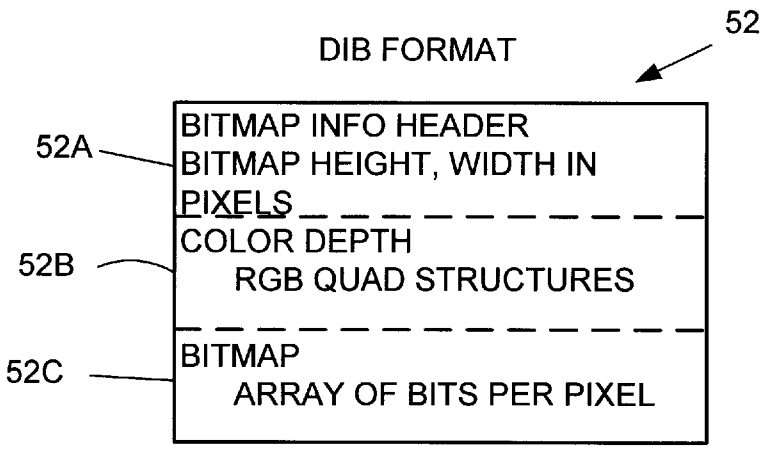
FIG. 3 is a block diagram of a device-independent bit map.

The device-independent format of a DIB 52 is shown in FIG. 3. A typical file format for a DIB includes a header structure 52*a* that provides information about the bitmap. This information includes the height and width of the desired bitmap in pixels, such as 100 by 200 pixels. Header 52*a* also indicates the color depth, such as eight or 16, and other attributes of the DIB. Color table 52*b*, if present, provides a color for each of the possible bit combinations for a pixel. For example, if the DIB specifies eight bits per pixel, then the color table has 256 entries, with each possible bit combination being a separate index into the color table. The entries in the color table, in turn, may represent indices into a color palette or represent colors directly. Bitmap 52*c* consists of an array of the bits for each pixel of the bitmap. For example, a 100 by 200 bitmap with a color depth of eight bits per pixel would have an array of 100 * 200 * 8=160,000 bits. For the purposes of the invention, these are the pertinent portions of the DIB file format. A more detailed description of a DIB file format may be found in a number of references, including *Programming Windows* 3.1, Microsoft Press, 1992.

Figure 4:
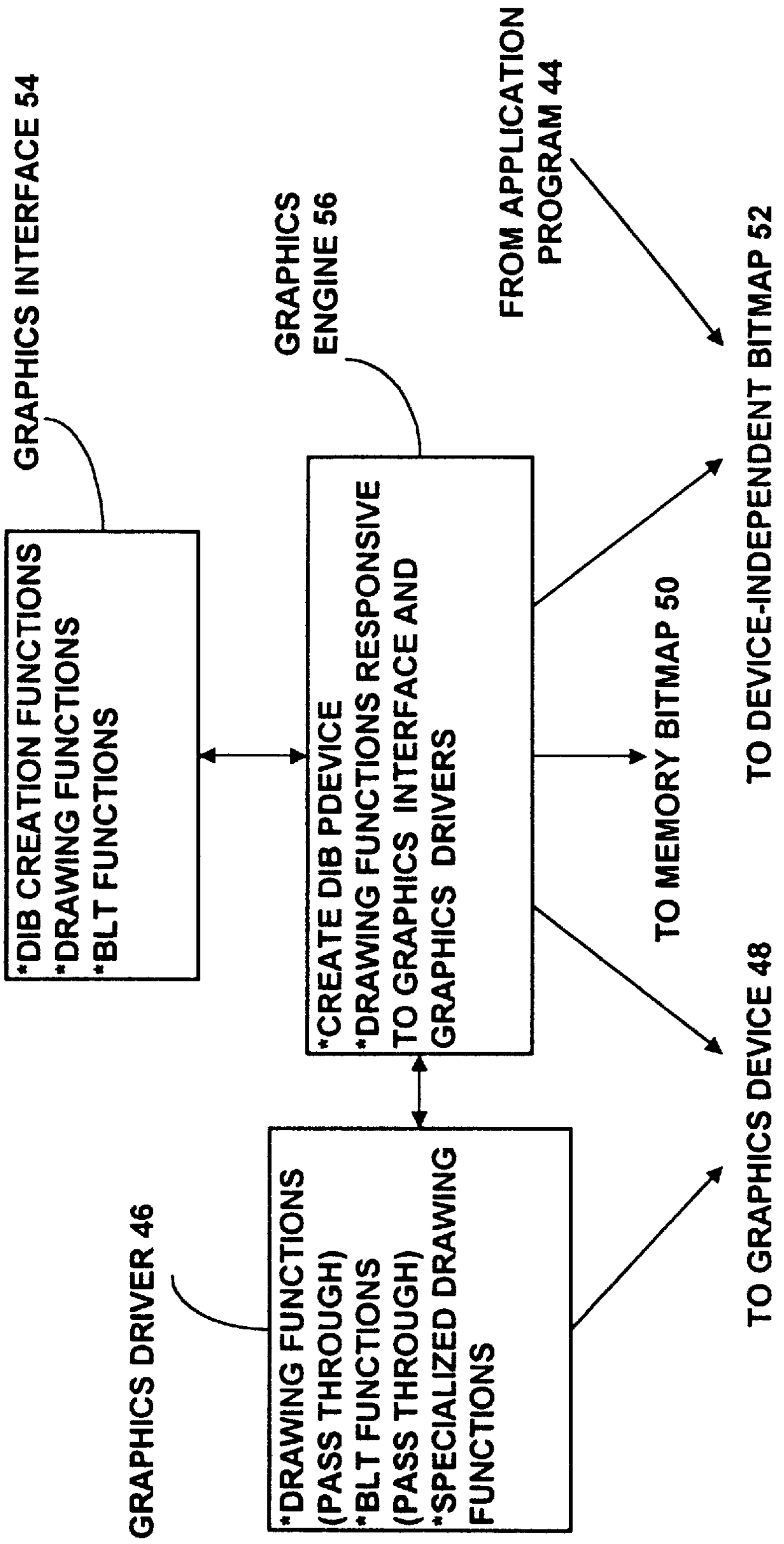
FIG. 4 is a more detailed view of the graphics interface, display driver and graphics engine of FIG. 2.

FIG. 4 is a more detailed view of the graphics interface 54, display drivers 46, and graphics engine 56 in the preferred embodiment. A set of functions defining the graphics interface are collected in a module of operating system 42. This module may be a self-contained unit whose code is separate from the code of other modules of the operating system. Within graphics interface 54 are functions for creating bitmaps, drawing onto these bitmaps and onto the screen memory, and copying or otherwise transferring bitmaps from one memory surface to another (blt functions). Also included are functions unique to the present invention for enabling an application to draw directly or indirectly onto DIBs, as generally explained above. The function call to graphics engine 56 is just one method for creating a device-independent bitmap of the desired format. Graphics interface itself may contain the necessary code, or it may make calls to other modules in addition or instead of to the graphics engine.

FIG. 4 also shows a preferred form of graphics engine 56. The graphics engine is also a module that contains a set of functions for creating a DIB, for performing graphics operations on DIBs, other bitmaps and physical devices, and for converting objects from one color depth to another. These functions include drawing, copying and other transfer functions (known as "blitting"). They also contain a function for creating a DIB in response to a function call from graphics interface 54.

Figure 5:
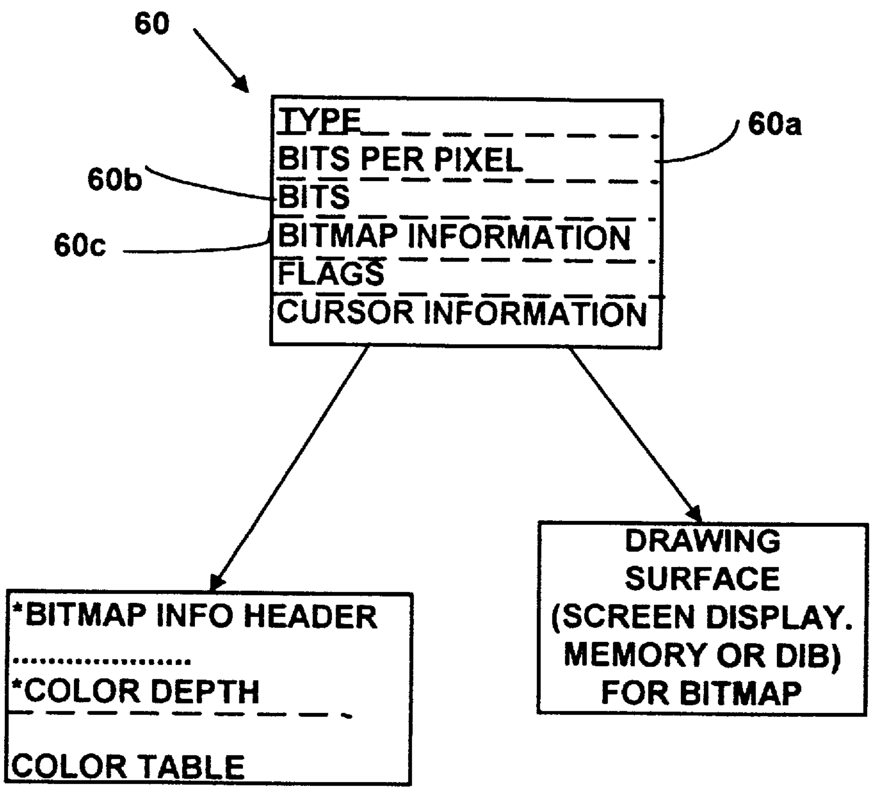
FIG. 5 is a block diagram of a device structure for passing data to a display driver or display engine.

A DIB device structure 60 is shown in the block diagram of FIG. 5. The device structure is passed as a parameter to graphics engine 56 and describes the format of a DIB to be created. The structure includes a number of fields whose data is derived from the parameters passed by graphics interface 54. Of particular relevance are BitsPerPixel field 60*a*, Bits field 60*b* and BitMapInfo field 60*c*. BitsPerPixel field 60*a* indicates the number of bits for each pixel in the DIB to be created. Bits field 60*b* identifies the drawing surface for the DIB, that is, the memory location where the DIB will reside. BitMapInfo field 60*c* points to a data structure that describes the format of the DIB, the pixel characteristics and the color table.

FIG. 4 further shows a preferred form of a display driver 46. The display driver include drawing functions that may be called by graphics interface 54 to draw onto non-DIB bitmaps, such as the screen display of display device 48 and memory bitmaps 50. However, these drawing and blitting functions pass the drawing or copying tasks through to graphics engine 56 whenever possible. Only specialized drawing functions that require manipulation of the display hardware remain fully in the display driver. Drawing is thus centralized to a degree within graphics engine 56, reducing the duplication of code among the modules.

Figure 6:
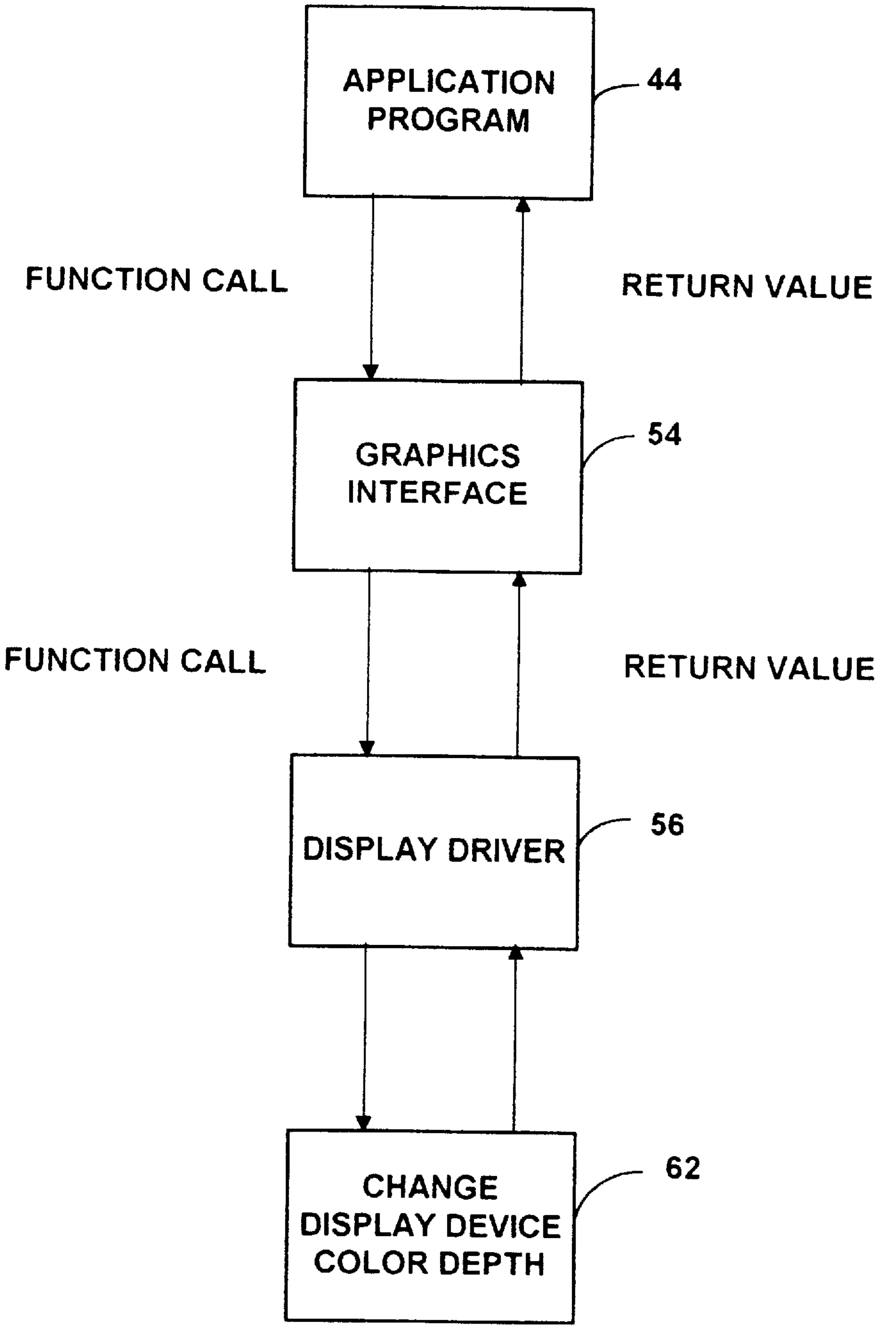
FIG. 6 is a data flow diagram showing, in a preferred embodiment of the invention, how the color depth of a display device may be dynamically changed.

FIG. 6 is a data flow diagram showing the process for changing the color depth of a display device 48. Once the color depth has been changed (as indicated in the FIG.), then the color depths of object resident in system memory are dynamically changed in response. When application 44 (which again may be a program acting automatically or the user interacting with the computer system through a utility) desires to change the color depth of a display device, it initiates the change by making a system call to graphics interface 54 to write a value to color depth file 55. As part of the call, application 44 passes to graphics interface 54 several parameters that identify the display device to be changed and the desired color depth. Graphics interface 54 responds by executing the system call which calls in response a corresponding function within display driver 46. The display driver then changes the color depth of the device by making calls into the basic input output system (BIOS) of the display hardware (62). During this time the screen of display device 48 is blanked by operating system 42 since the objects resident in system memory must be redrawn with a changed color depth before they can be properly displayed.

Figure 7:
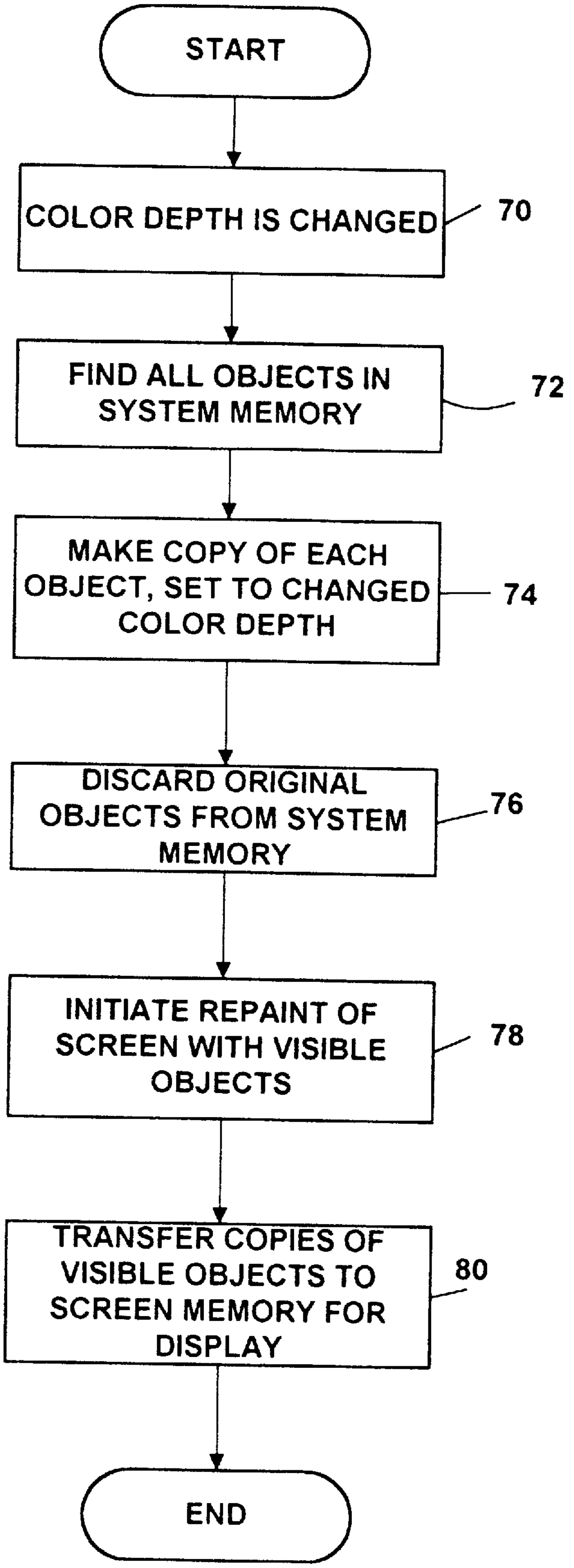
FIG. 7 is a flow chart showing one embodiment of a method for converting the color depth of objects displayed in a computer system.
Figure 8:
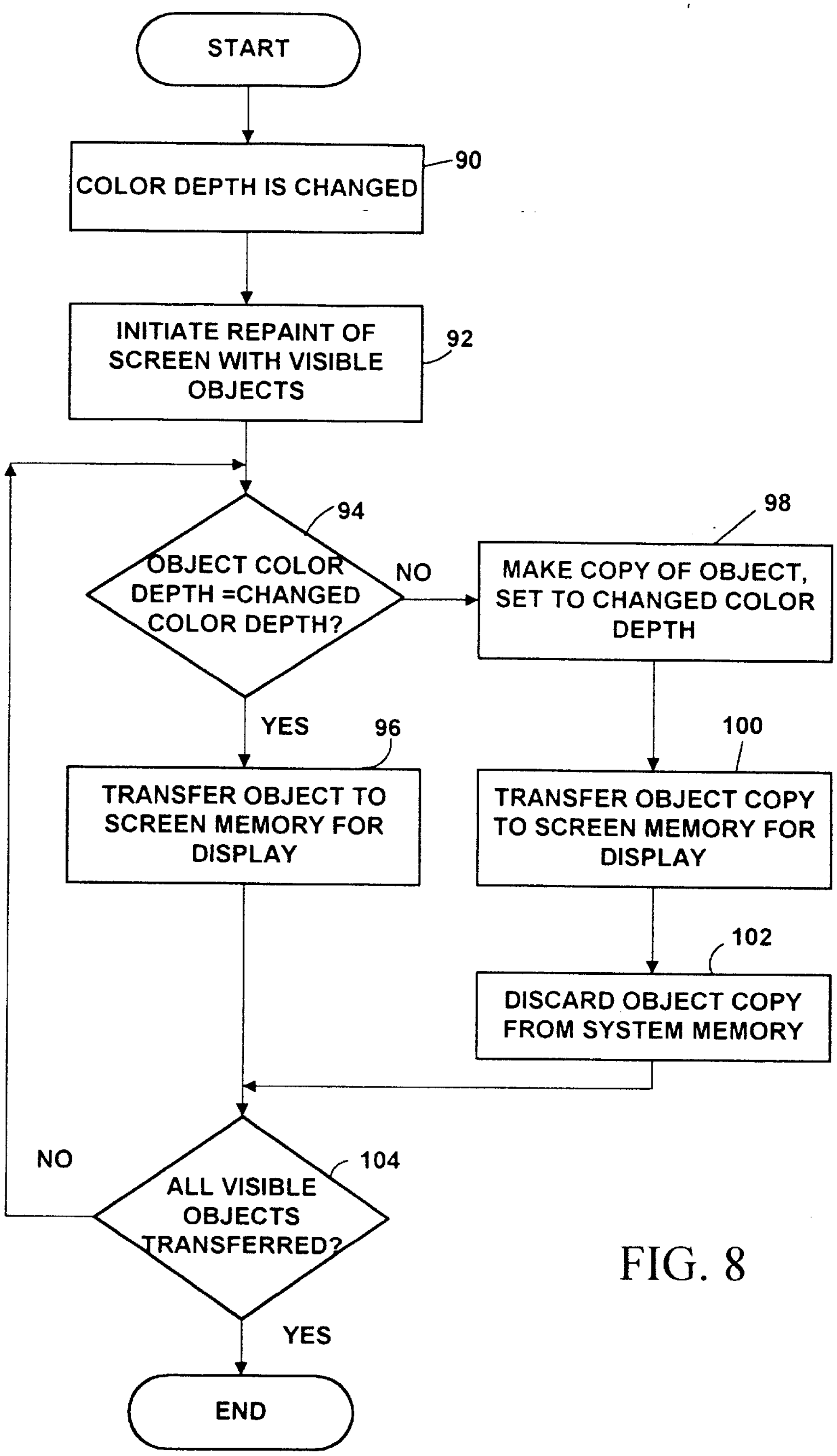
FIG. 8 is a flow chart showing another embodiment of the method for converting the color depth of objects displayed in a computer system.

It is in response to a change in the device color depth that objects whose color depth differs from the changed color depth are found and dynamically converted. This response may be accomplished in a number of ways. FIG. 7 shows a "single conversion" approach, wherein all of the objects are found and converted from their color depths to the changed color depth at one time. FIG. 8 shows a "on the fly" approach, wherein an object is found and converted to the changed color depth only when and if it is selected to transfer to a display device for display. By transfer is meant the copying or equivalent movement of the object to the display device. For purposes of relating the following explanation to the FIGS., each of the steps shown in these FIGS. are numbered. It should be understood that these steps need not be carried out in the order described but may be carried out in any order so long as the dynamic conversion occurs.

Referring to FIG. 7, the color depth of display device 46 is assumed changed by display driver 46 (70). In the present embodiment, application 44, in response to a user request, changes the color depth and calls to graphics interface 54 to find the physical objects that are resident in system memory (72), such as bitmaps, pens and brushes. With the physical objects located in system memory, the application then calls to graphics engine 56, which contains a series of conversion routines, to make a copy of each object such as a bitmap, set to the changed color depth (74). Prior to conversion, bitmaps are first converted from DDBs to DIBs.

These routines make use of convention al conversion techniques to change the internal data structures that represent the physical objects in system memory 38. One technique is the use of a look up table for bitmaps, of which there may be several. With a look up table, a table of bitmap colors with a different color depth is precompiled and stored in memory. The original bitmap colors are indexes into the table. An original bitmap color with a color depth is converted to a new bitmap color with a different color depth by applying the original bitmap color as an index to the color look up table. The new bitmap is a table entry corresponding to the index and is obtained in response to its application. For example, an original bitmap color with 8 bpp can be converted to a new bitmap color with 24 bpp through the use of a look up table with 256 entries, one corresponding to each of the possible original color bitmaps. Another technique is direct conversion, where one or more of the bits of the original bitmap color is directly transformed to produce a new bitmap color with a new number of bpp. For example, a 24 bpp color can be converted to 8 bpp by removing selective bits. Or an 8 bpp color can be converted to a 24 bpp color by padding the color with additional identical bits. These and other conversion techniques can be used to convert a bitmap's original color to the color depth of the display device. After conversion, the DIB is reconverted to a DDB.

Graphics engine 56 then returns to graphics interface 54 an identifier for each object copy with the changed color depth, such as a pointer to the copy's memory address. The original object is discarded from system memory (76) and its address space is now free to be overwritten.

With the copies of the objects completed, operating system 42 initiates the repainting of objects that should be visible on display device 48 (78). The visible objects are determined and the copies transferred to screen memory for display (80). Copies of non-visible objects are retained in system memory until transferred or replaced by other objects.

An alternative dynamic conversion technique is illustrated in FIG. 8. As in the first technique, the color depth of display device 46 is assumed changed by display driver 46 (90). During this time the screen of display device 48 is blanked since the objects must be redrawn with a changed color depth. Operating system 42 then responds by initiating a repaint of the screen (92). Through a call, graphics interface 54 requests display driver 46 to display the visible objects, i.e., transfer them to screen memory 39. This call is communicated by the display driver to graphics engine 56.

Graphics engine 56 then compares the color depth of the object to be transferred to the changed color depth (94) to determine if the object's color depth must be changed before display. If the object is already at the same color depth as the same color depth, the object is simply transferred to screen memory 39 for display (96). However, if the object's color depth does not match the changed color depth, then graphics engine 56 makes a copy of the object, with the color depth of the object set to the changed color depth (98). The copy is then transferred to the screen memory for display (100). The object copy in system memory is discarded, and the original object is retained (102).

Operating system 42 then checks to determine if all visible objects have been transferred (redrawn) to the screen (104). If not, another object is found and the process repeats according to steps 94–102.

As between the two techniques described above, each has its own advantages. The "single conversion" technique described with reference to FIG. 7 presently executes faster. On the other hand, the "on the fly conversion" technique described with reference to FIG. 8 has no global effect on the computer system. Changes to data structures are temporary and localized. Having illustrated and described the principles of the invention in a preferred embodiment, it should be apparent to those skilled in the art that the embodiment can be modified in arrangement and detail without departing from such principles. For example, the various functions of graphics engine 56, graphics interface 54 and display driver 46 may be interchanged in other embodiments without affecting the invention. And the specific steps for creating and discarding object copies and originals may be varied without departing from the invention. The elements of the preferred embodiments shown in software may be implemented in hardware and vice versa. Objects may or may not be copied for conversion. Functions may be grouped in any number of ways and not necessarily within the modules described above. In view of the many possible embodiments to which the principles of the invention may be applied, it should be recognized that the illustrated embodiments are only examples of the invention and are not limitations on the scope of the invention. Rather, the invention is defined by the following claims.

We claim:

1. A method for changing the color depth of an object stored as a device dependent bitmap in memory of a computer system in response to a change in the color depth of a display device, the method comprising the following steps:

- determining the changed color depth of the display device;
- finding in system memory an object whose color depth differs from the changed color depth;
- converting the object from a device dependent bitmap to a device independent bitmap, the device independent bitmap having the color depth of the device dependent bitmap;
- changing the color depth of the device independent bitmap to the changed color depth; and
- reconverting the device independent bitmap to a device dependent bitmap for the object, the device dependent bitmap having the changed color depth of the device independent bitmap.

2. The method of claim 1 wherein the finding step includes finding an object selected for transfer to the display device.

3. The method of claim 1 wherein the finding step includes finding at one time all of the objects in memory whose color depth differs from the changed color depth.

4. The method of claim 1 wherein the finding step includes:

checking the object color depth in memory against the changed color depth; and if the color depths match, transferring the object to the display device.

5. The method of claim 1 wherein the conversion step is initiated by a user.

6. The method of claim 1 wherein the conversion step is initiated by an application automatically.

7. The method of claim 1 wherein the changing step comprises using a look up table with the bits for each pixel being an index into the table.

8. The method of claim 1 wherein the changing step comprises duplicating one or more bits per pixel.

9. The method of claim 1 wherein the changing step comprises truncating one or more bits per pixel.

10. In a computer system, apparatus for changing the color depth of an object stored as a device dependent bitmap in memory of a computer system in response to a change in the color depth of a display device, the method comprising the following steps:

means for determining the changed color depth of the display device;

means for finding in system memory an object whose color depth differs from the changed color depth;

means for converting the object from a device dependent bitmap to a device independent bitmap, the device independent bitmap having the color depth of the device dependent bitmap;

means for changing the color depth of the device independent bitmap to the changed color depth; and means for reconverting the device independent bitmap to a device dependent bitmap for the object, the device dependent bitmap having the changed color depth of the device independent bitmap.

11. The apparatus of claim 10 wherein the finding means is adapted to find an object selected for transfer to the display device.

12. The apparatus of claim 10 wherein the finding means is adapted to find at one time all of the objects in memory whose color depth differs from the changed color depth.

13. The apparatus of claim 10 wherein the changing means comprises a look up table with the bits for each pixel being an index into the table.

14. The apparatus of claim 10 wherein the changing means comprises means for duplicating one or more bits per pixel.

15. The apparatus of claim 10 wherein the changing means comprises means for truncating one or more bits per pixel.

16. A computer-readable medium on which is stored a computer program for changing the color depth of an object stored as a device dependent bitmap in memory of a computer system in response to a change in the color depth of a display device, the computer program comprising:

instructions for determining the changed color depth of the display device;

instructions for finding in system memory an object whose color depth differs from the changed color depth;

instructions for converting the object from a device dependent bitmap to a device independent bitmap, the device independent bitmap having the color depth of the device dependent bitmap;

instructions for changing the color depth of the device independent bitmap to the changed color depth; and instructions for reconverting the device independent bitmap to a device dependent bitmap for the object, the device dependent bitmap having the changed color depth of the device independent bitmap.

* * * * *